United States Patent
Guo et al.

(10) Patent No.: US 10,291,887 B2
(45) Date of Patent: May 14, 2019

(54) PROJECTION SYSTEM AND CONTROL METHOD THEREFOR

(71) Applicant: APPOTRONICS CHINA CORPORATION, Shenzhen (CN)

(72) Inventors: Zuqiang Guo, Shenzhen (CN); Zeqin Wang, Shenzhen (CN)

(73) Assignee: APPOTRONICS CORPORATION LIMITED, Shenzhen (CN)

( * ) Notice: Subject to any disclaimer, the term of this patent is extended or adjusted under 35 U.S.C. 154(b) by 0 days.

(21) Appl. No.: 15/548,409

(22) PCT Filed: Jan. 28, 2016

(86) PCT No.: PCT/CN2016/072454
§ 371 (c)(1),
(2) Date: Aug. 2, 2017

(87) PCT Pub. No.: WO2016/124096
PCT Pub. Date: Aug. 11, 2016

(65) Prior Publication Data
US 2018/0041738 A1 Feb. 8, 2018

(30) Foreign Application Priority Data
Feb. 6, 2015 (CN) .............................. 201510063549

(51) Int. Cl.
H04N 9/31 (2006.01)
(52) U.S. Cl.
CPC ........... *H04N 9/3105* (2013.01); *H04N 9/312* (2013.01); *H04N 9/3155* (2013.01);
(Continued)
(58) Field of Classification Search
CPC ............... G03B 21/204; G03B 21/208; G03B 21/2013; G03B 21/2033; G03B 21/2053;
(Continued)

(56) References Cited

U.S. PATENT DOCUMENTS 8,724,033 B2   5/2014  Toyooka
2003/0147053 A1*  8/2003  Matsuda ................ G09G 1/285
                                                          353/31
(Continued)

FOREIGN PATENT DOCUMENTS

CN   101119459 A   2/2008
CN   101600120 A   12/2009
(Continued)

OTHER PUBLICATIONS

International Search Report in the parent PCT application No. PCT/CN2016/072454, dated Apr. 19, 2016.
(Continued)

*Primary Examiner* — Sultan Chowdhury
(74) *Attorney, Agent, or Firm* — Chen Yoshimura LLP (57) ABSTRACT

A projection system and a control method therefor. The projection system includes: a light source assembly generating three primary color lights capable of being adjusted separately, and a light modulation assembly for modulating the three primary color lights. The method includes: based on the maximum greyscale value of each primary color image in each frame of source images, determining a greyscale adjustment ratio of at least one primary color image; based on the greyscale adjustment ratio, correspondingly adjusting the greyscale value of the primary color image; and based on the adjusted greyscale value of each primary color image and the output power of a primary color light corresponding to the primary color image, controlling the power-on duration of the light modulation assembly, so that the greyscale brightness of each primary color image of display images formed by the light modulation assembly is improved in the same proportion.

19 Claims, 2 Drawing Sheets

(52) U.S. Cl.
CPC ......... *H04N 9/3158* (2013.01); *H04N 9/3167* (2013.01); *H04N 9/3182* (2013.01); *H04N 9/3161* (2013.01)

(58) Field of Classification Search
CPC .......... H04N 9/69; H04N 9/73; H04N 9/3105; H04N 9/3155; H04N 9/3161; H04N 9/3167; G09G 2360/144; G09G 2360/0285; G09G 2360/0626; G09G 2360/0666; G09G 2360/0693; G09G 5/02; G09G 5/06
See application file for complete search history.

(56) References Cited

U.S. PATENT DOCUMENTS

| | | | |
|---|---|---|---|
| 2006/0158516 A1* | 7/2006 | Suginobu | H04N 9/3147 348/189 |
| 2008/0030629 A1 | 2/2008 | Toyooka | |
| 2016/0112690 A1 | 4/2016 | Yang | |
| 2017/0264870 A1 | 9/2017 | Yang | |

FOREIGN PATENT DOCUMENTS

| | | |
|---|---|---|
| CN | 102854715 A | 1/2013 |
| CN | 103327275 A | 9/2013 |
| JP | 2007281893 A | 10/2007 |

OTHER PUBLICATIONS

IPRP in the parent PCT application No. PCT/CN2016/072454, dated Aug. 8, 2017.
Chinese Office Action, dated Aug. 17, 2017, and Search Report dated Aug. 8, 2017, in a counterpart Chinese patent application, No. CN 201510063549.X.

* cited by examiner

PROJECTION SYSTEM AND CONTROL METHOD THEREFOR

BACKGROUND OF THE INVENTION

Field of the Invention

This invention relates to projection display technologies, and in particular, it relates to a projection system and related control method.

Description of Related Art

Figure 1:
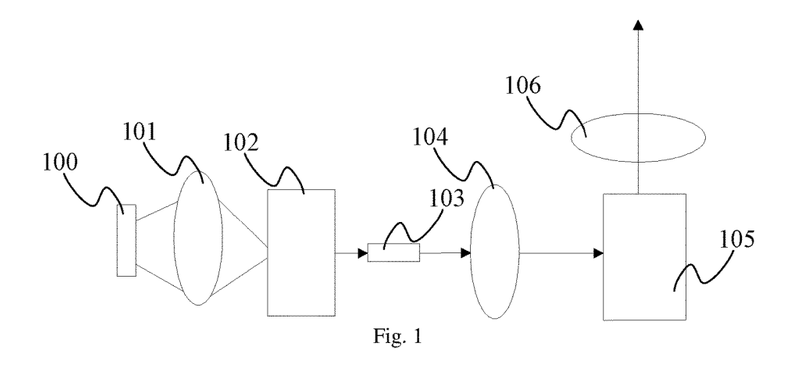
FIG. 1 schematically illustrates a conventional projection system.

Conventional technology provides a projection system, as shown in FIG. 1, which includes a light source 100, a collection lens 101, a phosphor wheel 102, a light rod 103, an optical relay system 104, a spatial light modulator system 105 and a projection lens 106. The light source 100 emits an excitation light, which is focused by the collection lens 101 onto the phosphor wheel 102. The phosphor wheel 102 generates red (R), green (G) and blue (B) primary color lights. The three primary color lights are homogenized by the light rod 103 and transmitted by the optical relay system 104, and inputted to the spatial light modulator system 105. The lights are modulated by the spatial light modulator system 105 and combined to form an image, which is projected by the projection lens 106 onto a predetermined plane. The light source 100 is a semiconductor laser. The spatial light modulator system 105 includes a single spatial light modulator component or multiple spatial light modulator components, which may be LCD (Liquid Crystal Display), LCOS (Liquid Crystal On Silicon), or DMD (Digital Micromirror Device), etc.

When the spatial light modulator system 105 includes a single spatial light modulator component, the grayscale values of the R, G and B primary color signals in a frame of image have maximum values of $A_R$, $A_G$, $A_B$ ($0 \leq A_R$, $A_G$, $A_B \leq 255$) respectively, the brightness values of the three primary colors are $L_R$, $L_G$ and $L_B$ respectively, and the maximum durations are $T_R$, $T_G$ and $T_B$ respectively, then these parameters satisfy the following relationships: the ratio of the three primary colors for achieving white balance is $x:y:z=L_R \cdot T_R : L_G \cdot T_G : L_B \cdot T_B$, the duration of a frame of image is $F=T_R+T_G+T_B$, the grayscale brightness values of the three primary colors are $L_R \cdot A_R \cdot T_R/255$, $L_G \cdot A_G \cdot T_G/255$, $L_B \cdot A_B \cdot T_B/255$ respectively, and the light utilization efficiency is $(L_R \cdot A_R \cdot T_R/255 + L_G \cdot A_G \cdot T_G/255 + L_B \cdot A_B \cdot T_B/255)/(L_R \cdot T_R + L_G \cdot T_G + L_B \cdot T_B)$.

When the spatial light modulator system 105 includes three spatial light modulator components, the grayscale values of the R, G and B primary color signals in a frame of image have maximum values of $A_R$, $A_G$, $A_B$ ($0 \leq A_R$, $A_G$, $A_B \leq 255$) respectively, the brightness values of the three primary colors are $L_R$, $L_G$ and $L_B$ respectively, and the maximum durations are all F, i.e. the duration of a frame, then these parameters satisfy the following relationships: the ratio of the three primary colors for achieving white balance is $x:y:z=L_R:L_G:L_B$, the grayscale brightness values of the three primary colors are $L_R \cdot A_R \cdot F/255$, $L_G \cdot A_G \cdot F/255$, $L_B \cdot A_B \cdot F/255$ respectively, and the light utilization efficiency is $(L_R \cdot A_R/255, L_G \cdot T_G/255, L_B \cdot A_B/255)/(L_R+L_G+L_B)$.

Because the conventional light modulation process achieves the grayscale values of the different primary color lights by reflecting away parts of the input primary color lights by the spatial light modulation components, when the grayscale values of the R, G, B primary colors of a frame of image are relatively low, i.e., when $A_R$, $A_G$, and $A_B$ values are relatively low, most of the primary color lights are reflected. This cause low light utilization efficiency of the spatial light modulator system, and low efficiency of the projection system.

SUMMARY

Accordingly, the present invention provides a projection system and related control methods to solve the problems of the conventional projection system, namely, the low light utilization efficiency of the spatial light modulator components and low efficiency of the projection system.

To achieve the above objects, the present invention provides the following technical solutions:

A control method for controlling a projection system, the projection system including a light source system for generating three primary color lights and a spatial light modulator system for modulating the three primary color lights, the method including:

based on maximum grayscale values of three primary color images of a frame of source image, determining a grayscale value adjustment ratio of at least one of the three primary color images;

based on the grayscale value adjustment ratio of the at least one primary color image, adjusting grayscale values of the primary color images;

based on the adjusted grayscale values of the primary color images and light output powers of the primary color lights generated by the light source system that correspond to the primary color images, controlling an ON time of the spatial light modulator system, wherein in the projected image formed by the spatial light modulator system, grayscale brightness values of all of the primary color images are increased by a same ratio relative to grayscale brightness values of the corresponding primary color images of the source image.

Preferably, the step of based on the maximum grayscale value of the primary color images of the frame of source image, determining the grayscale value adjustment ratio of the at least one primary color image includes:

obtaining a maximum grayscale value Ai of a primary color image of the source image; and setting the grayscale value adjustment ratio for that primary color to Mi;

wherein $1 \leq Mi \leq (K/Ai)$, wherein i is an index of the primary color image, and K is a maximum grayscale value that the spatial light modulator system is capable of displaying.

Preferably, the step of based on the grayscale value adjustment ratio of the at least one primary color image, adjusting grayscale values of the primary color images includes:

adjusting the grayscale value of the primary color image to Ai', wherein Ai'=Ai*Mi, wherein Ai is the grayscale value of the primary color before the adjustment, and Ai' is a grayscale value of the primary color after the adjustment.

Preferably, in the step of based on the adjusted grayscale values of the primary color images and light output powers of the primary color lights that correspond to the primary color images, controlling the ON time of the spatial light modulator system, wherein in the projected image formed by the spatial light modulator system, the grayscale brightness values of the primary color images are increased by the same ratio relative to the grayscale brightness values of the corresponding primary color images of the source image, the adjusted grayscale values of the primary color images satisfy:

$$A_R:A_G:A_B = A_R':A_G':A_B', \text{ wherein } A_R'=A_R \times M_R,$$
$$A_G'=A_G \times M_G, \text{ and } A_B'=A_B \times M_B;$$

wherein $A_R$ is a maximum grayscale value of a red primary color image before adjustment, $A_G$ is a maximum grayscale value of a green primary color image before adjustment, $A_B$ is a maximum grayscale value of a blue primary color image before adjustment;

wherein $A_R'$ is a maximum grayscale value of the red primary color image after adjustment, $A_G'$ is a maximum grayscale value of the green primary color image after adjustment, $A_B'$ is a maximum grayscale value of the blue primary color image after adjustment; and wherein $M_R$ is a grayscale value adjustment ratio of the red primary color image, $M_G$ is a grayscale value adjustment ratio of the green primary color image, and $M_B$ is a grayscale value adjustment ratio of the blue primary color image.

Preferably, the three primary color lights generated by the light source system are independently adjustable.

Preferably, the method further includes, before the step of based on the adjusted grayscale values of the primary color images and the light output powers of the primary color lights, controlling the ON time of the spatial light modulator system:

based on the grayscale value adjustment ratio of the at least one primary color image, adjusting the light output powers of the primary color lights that correspond to the primary color images of the source image, wherein in the projected image formed by the spatial light modulator system, the grayscale brightness values of the primary color images are increased by the same ratio relative to the grayscale brightness values of the corresponding primary color images of the source image;

wherein the step of based on the adjusted grayscale values of the primary color images and light output powers of the primary color lights, controlling the ON time of the spatial light modulator system includes:

based on the adjusted light output powers of the primary color lights that correspond to the primary color images and the adjusted grayscale values of the corresponding primary color images, adjusting the ON time of the spatial light modulator system.

Preferably, the step of based on the grayscale value adjustment ratio of the at least one primary color image, adjusting the light output powers of the primary color lights that correspond to the primary color images of the source image includes:

based on the grayscale value adjustment ratio of the at least one primary color image, adjusting sustained durations or brightness values of the primary color lights that correspond to the primary color images of the source image.

Preferably, the step of based on the grayscale value adjustment ratio of the at least one primary color image, adjusting the sustained duration of the primary color lights that correspond to the primary color images of the source image includes:

adjusting the sustained durations of the primary color lights to $T_R'$, $T_G'$ and $T_B'$, which satisfy:

$$T_R + T_G + T_B = T_R' + T_G' + T_B' = T; \qquad (1)$$

$$L_R \times A_R \times \frac{T_R}{K} : L_G \times A_G \times \frac{T_G}{K} : L_B \times A_B \times \frac{T_B}{K} = \qquad (2)$$

$$L_R \times A_R' \times \frac{T_R'}{K} : L_G \times A_G' \times \frac{T_G'}{K} : L_B \times A_B' \times \frac{T_B'}{K};$$

wherein $A_R' = A_R \times M_R$; $A_G' = A_G \times M_G$; $A_B' = A_B \times M_B$; T is a display duration of a frame of image, K is a maximum grayscale value that the spatial light modulator system is capable of displaying;

wherein $A_R$ is a maximum grayscale value of a red primary color image before adjustment, $A_G$ is a maximum grayscale value of a green primary color image before adjustment, $A_B$ is a maximum grayscale value of a blue primary color image before adjustment;

wherein $A_R'$ is a maximum grayscale value of the red primary color image after adjustment, $A_G'$ is a maximum grayscale value of the green primary color image after adjustment, $A_B'$ is a maximum grayscale value of the blue primary color image after adjustment;

wherein $M_R$ is a grayscale value adjustment ratio of the red primary color image, $M_G$ is a grayscale value adjustment ratio of the green primary color image, $M_B$ is a grayscale value adjustment ratio of the blue primary color image;

wherein $L_R$ is a brightness value of the red primary color light, $L_G$ is a brightness value of the green primary color light, $L_B$ is a brightness value of the blue primary color light; and wherein $T_R$ is a sustained duration of the red primary color light before adjustment, $T_G$ is a sustained duration of the green primary color light before adjustment, and $T_B$ is a sustained duration of the blue primary color light before adjustment.

Preferably, the step of based on the grayscale value adjustment ratio of the at least one primary color image, adjusting the brightness values of the primary color lights that correspond to the primary color images of the source image includes:

adjusting the brightness values of the primary color lights to $L_R'$, $L_G'$ and $L_B'$, which satisfy:

$$L_R + L_G + L_B = L_R' + L_G' + L_B' = L; \qquad (1)$$

$$L_R \times A_R \times \frac{T}{K} : L_G \times A_G \times \frac{T}{K} : L_B \times A_B \times \frac{T}{K} = \qquad (2)$$

$$L_R' \times A_R' \times \frac{T}{K} : L_G' \times A_G' \times \frac{T}{K} : L_B' \times A_B' \times \frac{T}{K};$$

wherein $A_R' = A_R \times M_R$; $A_G' = A_G \times M_G$; $A_B' = A_B \times M_B$; T is a display duration of a frame of image, L is a total brightness value of the three primary color lights, K is a maximum grayscale value that the spatial light modulator system is capable of displaying;

wherein $A_R$ is a maximum grayscale value of a red primary color image before adjustment, $A_G$ is a maximum grayscale value of a green primary color image before adjustment, $A_B$ is a maximum grayscale value of a blue primary color image before adjustment;

wherein $A_R'$ is a maximum grayscale value of the red primary color image after adjustment, $A_G'$ is a maximum grayscale value of the green primary color image after adjustment, $A_B'$ is a maximum grayscale value of the blue primary color image after adjustment;

wherein $M_R$ is a grayscale value adjustment ratio of the red primary color image, $M_G$ is a grayscale value adjustment ratio of the green primary color image, $M_B$ is a grayscale value adjustment ratio of the blue primary color image; and wherein $L_R$ is a brightness of the red primary color light, $L_G$ is a brightness of the green primary color light, and $L_B$ is a brightness of the blue primary color light.

In another aspect, the present invention provides projection system, including a light source system, a spatial light modulator system, and an image processing system;

wherein the light source system generates three primary color lights;

wherein the spatial light modulator system includes at least one spatial light modulator component for modulating the three primary color lights, wherein the image processing system is configured to: based on maximum grayscale values of the primary color images of a frame of source image, determine a grayscale value adjustment ratio of at least one of the primary color images; based on the grayscale value adjustment ratio, adjust grayscale values of the primary color images; based on the grayscale value adjustment ratio of the at least one primary color image, adjust light output powers of the primary color lights generated by the light source system that correspond to the primary color images of the source image; and based on the adjusted output powers of the primary color lights and the adjusted grayscale values of the primary color images, adjust an ON time of the spatial light modulator system; wherein in a projected image formed by the spatial light modulator system, grayscale brightness values of the primary color images are increased by a same ratio relative to grayscale brightness values of the corresponding primary color images of the source image.

Preferably, the light source system includes a light source, a switching system, and a color wheel system;

wherein the switching system switches a light emitted by the light source into at least three light beams using time division or light intensity division; and wherein the color wheel system is disposed on the transmission path of each of the at least three light beams, for generating three primary color lights of predetermined ratios when illuminated by the at least three light beams.

Preferably, the switching system switches the light emitted by the light source into at least three light beams using time division, the switching system includes a first light switch, a second light switch and a first controller;

wherein the first light switch switches the light emitted by the light source into a first light beam within first time intervals, and switches the light emitted by the light source into a second light beam within second time intervals, where the first light beam and the second light beam have different polarization states;

wherein the second light switch switches the second light beam into a third light beam within first sub-intervals of the second time intervals, and switches the second light beam into a fourth light beam within a second sub-intervals of the second time intervals, where the third light beam and the fourth light beam have different polarization states;

wherein the first controller, based on the grayscale value adjustment ratio of the at least one primary color image, controls durations of the first light beam and the second light beam output by the first light switch and durations of the third light beam and the fourth light beam output by the second light switch, to control the light output powers of the primary color lights generated by the light source system that correspond to the primary color images of the source image.

Preferably, the switching system switches the light emitted by the light source into at least three light beams using light intensity division, the switching system includes a first light switch, a second light switch and a first controller;

wherein the first light switch switches the light emitted by the light source into a first light beam and a second light beam simultaneously, where the first light beam and the second light beam have different polarization states;

wherein the second light switch switches the second light beam into a third light beam and a fourth light beam simultaneously, where the third light beam and the fourth light beam have different polarization states;

wherein the first controller, based on the grayscale value adjustment ratio of the at least one primary color image, controls rotation angles of the first light switch and the second light switch, to control the light output powers of the primary color lights generated by the light source system that correspond to the primary color images of the source image.

Preferably, the color wheel system includes a first color wheel, a second color wheel, and a third color wheel;

wherein the first color wheel is located on a first light path of the first light beam, for generating the first primary color light when illuminated by the first light beam; wherein the second color wheel is located on a second light path of the third light beam, for generating the second primary color light when illuminated by the third light beam; and wherein the third color wheel is located on a third light path of the fourth light beam, for generating the third primary color light when illuminated by the fourth light beam.

Preferably, the first color wheel is a color wheel containing a red phosphor, wherein the first primary color light is a red light; wherein the second color wheel is a color wheel containing a green phosphor, wherein the second primary color light is a green light; and wherein the third color wheel is a color wheel containing a blue phosphor, wherein the third primary color light is a blue light.

Preferably, the switching system further includes a first dichroic prism, a second dichroic prism, and a reflector;

wherein the first dichroic prism is located between the first light switch and the first color wheel, for reflecting the first light beam to the first light path and transmitting the second light beam;

wherein the second dichroic prism is located between the second light switch and the second color wheel, for reflecting the third light beam to the second light path and transmitting the fourth light beam; and wherein the reflector is located between the second dichroic prism and the third color wheel, for reflecting the fourth light beam to the third light path.

Preferably, the projection system further includes a light combination system located between the light source system and the spatial light modulator system;

wherein the light combination system includes at least one reflector and at least two dichroic mirrors, wherein the reflector and the dichroic mirrors are respectively located on output paths of different primary color lights, for reflecting the primary color lights to the spatial light modulator system.

Preferably, the switching system switches the light emitted by the light source into the at least three light beams using time division, the spatial light modulator system includes a light splitting and combining prism, a spatial light modulator component and a second controller;

wherein the light splitting and combining prism sequentially transmits the first primary color light, the second primary color light and the third primary color light to the spatial light modulator component; and wherein the spatial light modulator component sequentially modulates the first primary color light, the second primary color light and the third primary color light, wherein the modulated first primary color light, second primary color light and third primary color light combine to form an image; and wherein the second controller, based on the adjusted grayscale values of the primary color images and the light output powers of the primary color lights that correspond to the primary color images, controls the ON time of the spatial light modulator component.

Preferably, the switching system switches the light emitted by the light source into at least three light beams using light intensity division, the switching system includes a light splitting and combining prism, a first spatial light modulator component, a second spatial light modulator component, a third spatial light modulator component and a second controller;

wherein the light splitting and combining prism transmits the first primary color light to the first spatial light modulator component, transmits the second primary color light to the second spatial light modulator component, transmits the third primary color light to the third spatial light modulator component;

wherein the first spatial light modulator component modulates the first primary color light;

wherein the second spatial light modulator component modulates the second primary color light;

wherein the third spatial light modulator component modulates the third primary color light; and wherein the second controller, based on the adjusted grayscale values of the primary color images and the light output powers of the primary color lights that correspond to the primary color images, controlling an ON time of each of the first spatial light modulator component, the second spatial light modulator component and the third spatial light modulator component.

Compared to conventional technologies, embodiments of the present invention have the following advantages:

In the projection system an the control method according to embodiments of the present invention, based on the maximum grayscale values of the primary color images of the source image, the grayscale value adjustment ratio of at least one primary color image is determined; based on the grayscale value adjustment ratio of at least one primary color image, the grayscale values of the corresponding primary color images are adjusted; and based on the adjusted grayscale values of the primary color images and the light output powers of the primary color lights, the ON time of the spatial light modulator system is adjusted. This way, in the projected image formed by the spatial light modulator system, the grayscale brightness values of the primary color images are increased by the same ratio relative to the grayscale brightness values of the corresponding primary color images of the source image. I.e., by increasing the grayscale value of at least one primary color image, the utilization efficiency of the spatial light modulator system and the efficiency of the projection system are increased.

BRIEF DESCRIPTION OF THE DRAWINGS

To more clearly explain the embodiments of the present invention and the conventional technology, the following drawings are referred to in the description. These drawings are for illustrative purposes only, and those skilled in the art can derive other drawings from these drawings below without creative work.

DETAILED DESCRIPTION OF PREFERRED EMBODIMENTS

Embodiments of the present invention are described in detail below with reference to the drawings. These embodiments are only some embodiments, and not all embodiments of the present invention. Based on the embodiments described below, those skilled in the art may derive other embodiments without creative work, all of which are within the scope of the present invention.

First Embodiment

Figure 2:
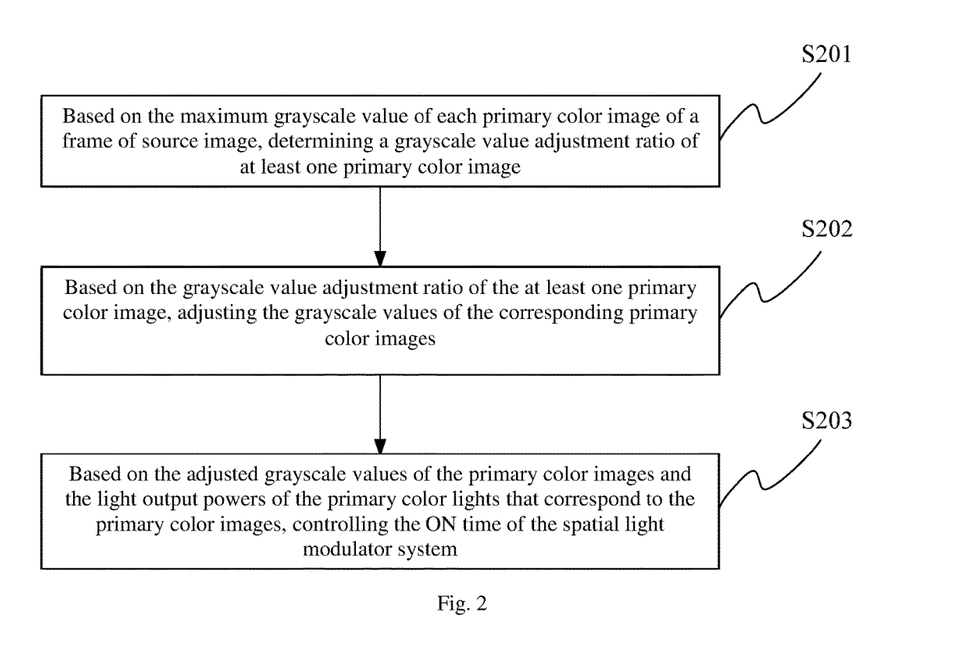
FIG. 2 schematically illustrates a control process flow for a projection system according to a first embodiment of the present invention.

This embodiment provides a control process for a projection system. The projection system includes a light source system and a spatial light modulator system. The light source system generates three primary color lights that can be independently adjusted. The spatial light modulator system is used to modulate the three primary color lights. The control process flow, as shown in FIG. 2, includes:

Step S201: Based on the maximum grayscale value of each primary color image of a frame of source image, determining a grayscale value adjustment ratio of at least one primary color image.

From the input video or image data, the projection system obtains source image data to be projected. The source image data includes individual frames of source images, and each frame of source image includes three primary color image data that together form the color image. Thus, from each frame of source image data, the maximum grayscale values of the primary color images of the frame of source image are obtained. Then, based on the maximum grayscale values of the primary color images of the frame of source image, the grayscale value adjustment ratio of at least one primary color image is determined.

More specifically, this step includes: Obtaining the maximum grayscale value $A_i$ of a primary color image of the source image, and setting the grayscale value adjustment ratio for that primary color to $M_i$, where $1 \leq M_i \leq (K/A_i)$, where i is an index of the primary color image. For example: when i is R, $A_R$ is the maximum grayscale value of the red primary color image, and $M_R$ is the grayscale value adjustment ratio for the red primary color image; when i is G, $A_G$ is the maximum grayscale value of the green primary color image, and $M_G$ is the grayscale value adjustment ratio for the green primary color image; and when i is B, $A_B$ is the maximum grayscale value of the blue primary color image, and $M_B$ is the grayscale value adjustment ratio for the blue primary color image. K is the maximum grayscale value that can be displayed by the spatial light modulator system, which is typically 255.

Step S202: Based on the grayscale value adjustment ratio of the at least one primary color image, adjusting the grayscale values of the corresponding primary color images.

More specifically, this step includes: Adjusting the grayscale value of the primary color image to $A_i'$, where $A_i' = A_i * M_i$, where $A_i$ is the grayscale value of the primary color before the adjustment, and $A_i'$ is the grayscale value of the primary color after the adjustment. Here, the grayscale value of the primary color image refers to the grayscale value of each pixel, i.e., the R, G, B pixels of the image, thus, the above equation refers to multiplying the grayscale value of each pixel before the adjustment by the grayscale value adjustment ratio, to achieve the grayscale value adjustment of the primary color image.

Because $1 \leq Mi \leq (K/Ai)$, and $Ai'=Ai*Mi$, therefore $Ai \leq Ai' \leq K$. Further, in actual implementation, to maximally increase the brightness of the projected image, the maximum grayscale values of all three primary color images can be adjusted to K (e.g. 255), i.e., $A_R'=K$, $A_G'=K$, and $A_B'=K$. Of course, the invention is not limited to this; in other embodiments, the grayscale value adjustment ratios of the primary color images may be set to other values.

Step S203: Based on the adjusted grayscale values of the primary color images and the light output powers of the primary color lights that correspond to the primary color images, controlling the ON time of the spatial light modulator system, so that in the projected image formed by the spatial light modulator system, the grayscale brightness values of the primary color images are increased by the same ratio relative to the grayscale brightness values of the corresponding primary color images of the source image.

In this embodiment, when adjusting the grayscale values of the primary color images, the adjusted grayscale values of the primary color images satisfy the following condition:

$$A_R:A_G:A_B = A_R':A_G':A_B', \text{ where } A_R'=A_R \times M_R, A_G'=A_G \times M_G, \text{ and } A_B'=A_B \times M_B;$$

where $A_R$ is the maximum grayscale value of the red primary color image before adjustment; $A_G$ is the maximum grayscale value of the green primary color image before adjustment; $A_B$ is the maximum grayscale value of the blue primary color image before adjustment; $A_R'$ is the maximum grayscale value of the red primary color image after adjustment; $A_G'$ is the maximum grayscale value of the green primary color image after adjustment; $A_B'$ is the maximum grayscale value of the blue primary color image after adjustment; $M_R$ is the grayscale value adjustment ratio of the red primary color image; $M_G$ is the grayscale value adjustment ratio of the green primary color image; and $M_B$ is the grayscale value adjustment ratio of the blue primary color image. This way, the projected image after the adjustment and the projected image before the adjustment can maintain consistent white balance, which prevents adverse impact on the projected image quality due to white balance drift.

After adjusting the grayscale values of the primary color images using the above adjustment ratios, based on the adjusted grayscale values of the primary color images and the light output powers of the corresponding primary color lights generated by the light source of the projection system, the ON time of the spatial light modulator system is controlled. This way, the utilization efficiency of the spatial light modulator system is increased, and the brightness of the projected image of the projection system is increased.

In another embodiment, after adjusting the grayscale values of corresponding primary color images based on the grayscale value adjustment ratio of at least one primary color image, the process further includes:

Based on the grayscale value adjustment ratio of the at least one primary color image, adjusting the light output powers of the primary color lights generated by the light source that correspond to the primary color images of the source image.

After adjusting the light output powers, based on the adjusted output powers of the primary color lights and the adjusted grayscale values, the ON time of the spatial light modulator system is adjusted. This way, not only is the ON time of the spatial light modulator system is adjusted, the output powers of the light source are also adjusted; therefore, in addition to increasing the utilization efficiency of the spatial light modulator system, the brightness of the projected image of the projection system is further increased, and the light utilization efficiency of the projection system is increased.

In the above steps, the adjustment of the output powers of the primary color lights generated by the light source includes: Based on the grayscale value adjustment ratio of at least one primary color image, adjusting the sustained durations or brightness values of the primary color lights.

More specifically, the adjustment of the sustained durations of the primary color lights includes: Adjusting the sustained durations of the primary color lights to $T_R'$, $T_G'$ and $T_B'$, which satisfy the following two conditions:

$$T_R + T_G + T_B = T_R' + T_G' + T_B' = T; \qquad (1)$$

$$L_R \times A_R \times \frac{T_R}{K}: L_G \times A_G \times \frac{T_G}{K}: L_B \times A_B \times \frac{T_B}{K} = \qquad (2)$$
$$L_R \times A_R' \times \frac{T_R'}{K}: L_G \times A_G' \times \frac{T_G'}{K}: L_B \times A_B' \times \frac{T_B'}{K};$$

where $A_R'=A_R \times M_R$; $A_G'=A_G \times M_G$; $A_B'=A_B \times M_B$; T is the display duration of a frame of image; K is the maximum grayscale value that can be achieved by the spatial light modulator system; $A_R$ is the maximum grayscale value of the red primary color image before adjustment; $A_G$ is the maximum grayscale value of the green primary color image before adjustment; $A_B$ is the maximum grayscale value of the blue primary color image before adjustment; $A_R'$ is the maximum grayscale value of the red primary color image after adjustment; $A_G'$ is the maximum grayscale value of the green primary color image after adjustment; $A_B'$ is the maximum grayscale value of the blue primary color image after adjustment; $M_R$ is the grayscale value adjustment ratio of the red primary color image; $M_G$ is the grayscale value adjustment ratio of the green primary color image; $M_B$ is the grayscale value adjustment ratio of the blue primary color image; $L_R$ is the brightness value of the red primary color light; $L_G$ is the brightness value of the green primary color light; $L_B$ is the brightness value of the blue primary color light; $T_R$ is the sustained duration of the red primary color light before adjustment; $T_G$ is the sustained duration of the green primary color light before adjustment; and $T_B$ is the sustained duration of the blue primary color light before adjustment.

Similarly, the adjustment of the brightness values of the primary color lights includes: Adjusting the brightness values of the primary color lights to $L_R'$, $L_G'$ and $L_B'$, which satisfy the following two conditions:

$$L_R + L_G + L_B = L_R' + L_G' + L_B' = L; \qquad (1)$$

$$L_R \times A_R \times \frac{T}{K}: L_G \times A_G \times \frac{T}{K}: L_B \times A_B \times \frac{T}{K} = \qquad (2)$$
$$L_R' \times A_R' \times \frac{T}{K}: L_G' \times A_G' \times \frac{T}{K}: L_B' \times A_B' \times \frac{T}{K};$$

where $A_R'=A_R \times M_R$; $A_G'=A_G \times M_G$; $A_B'=A_B \times M_B$; T is the display duration of a frame of image; L is the total brightness value of the three primary color lights; K is the maximum grayscale value that can be achieved by the spatial light modulator system, $A_R$ is the maximum grayscale value of the red primary color image before adjustment; $A_G$ is the maximum grayscale value of the green primary color image before adjustment; $A_B$ is the maximum grayscale value of the blue primary color image before adjustment; $A_R'$ is the maximum grayscale value of the red primary color image after adjustment; $A_G'$ is the maximum grayscale value of the green primary color image after adjustment; $A_B'$ is the maximum grayscale value of the blue primary color image after adjustment; $M_R$ is the grayscale value adjustment ratio of the red primary color image; $M_G$ is the grayscale value adjustment ratio of the green primary color image; $M_B$ is the grayscale value adjustment ratio of the blue primary color image; $L_R$ is the brightness of the red primary color light; $L_G$ is the brightness of the green primary color light; and $L_B$ is the brightness of the blue primary color light. In the projection system control method of this embodiment, based on the maximum grayscale values of the primary color images of the source image, the grayscale value adjustment ratio of at least one primary color image is determined; based on the grayscale value adjustment ratio of at least one primary color image, the grayscale values of the corresponding primary color images are adjusted; based on the adjusted grayscale values of the primary color images and the light output powers of the primary color lights, the ON time of the spatial light modulator system is adjusted. This way, in the projected image formed by the spatial light modulator system, the grayscale brightness values of the primary color images are increased by the same ratio relative to the grayscale brightness values of the corresponding primary color images of the source image. I.e., by increasing the grayscale value of at least one primary color image, the utilization efficiency of the spatial light modulator system and the efficiency of the projection system are increased.

Second Embodiment

This embodiment provides a projection system, including a light source system, a spatial light modulator system, an image processing system and a light combination system. The light source system generates three primary color lights that are independently adjustable. The spatial light modulator system includes at least one spatial light modulator component for modulating the three primary color lights, so that the modulated three primary color lights can be combined to form a projected image. The image processing system performs the following: based on the maximum grayscale values of the primary color images of a frame of source image, determining a grayscale value adjustment ratio of at least one primary color image; based on the grayscale value adjustment ratio, adjusting the grayscale values of the corresponding primary color image; based on the grayscale value adjustment ratio of the at least one primary color image, adjusting the light output powers of the primary color lights generated by the light source system; and based on the adjusted output powers of the primary color lights and the adjusted grayscale values of the primary color images, adjusting the ON time of the spatial light modulator system. This way, in the projected image formed by the spatial light modulator system, the grayscale brightness values of the primary color images are increased by the same ratio relative to the grayscale brightness values of the corresponding primary color images of the source image. The light combination system is disposed between the light source system and the spatial light modulator system, and includes at least one reflector and at least two dichroic mirrors, where the reflector and the dichroic mirrors are respectively disposed on the output light paths of the different primary color lights, to reflect the three primary lights to the spatial light modulator system.

Figure 3:
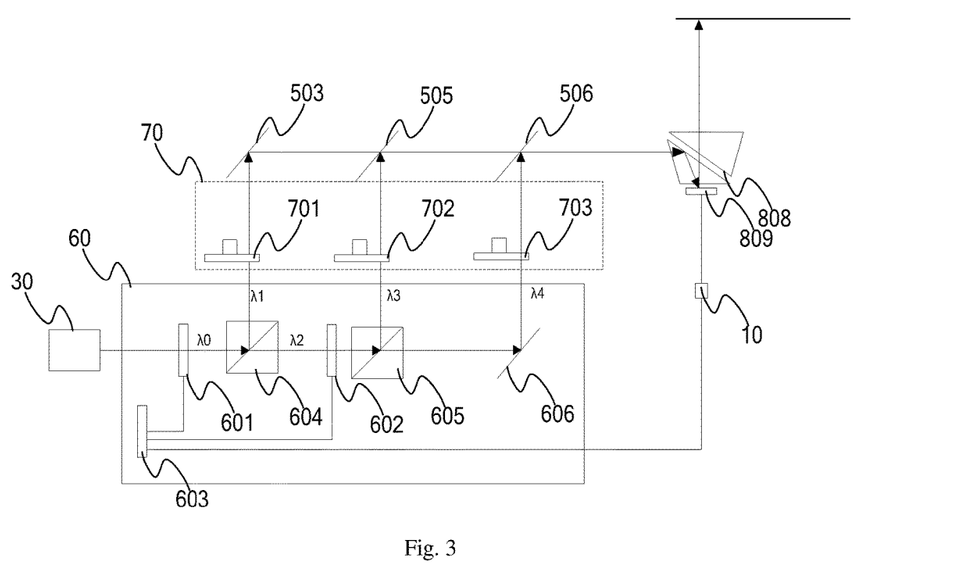
FIG. 3 schematically illustrates a structure of a projection system according to a second embodiment of the present invention.

In this embodiment, as shown in FIG. 3, the light source system includes a light source 30, a switching system 60 and a color wheel system 70. The light source 30 is a laser module emitting a blue light. The laser module may include one or more semiconductor lasers. The switching system 60 switches the light emitted by the light source 30 into at least three light beams using time division. The color wheel system 70 is disposed on the transmission path of each of the at least three light beams, and when illuminated by the at least three light beams, generates three primary color lights of predetermined ratios. For example, the color wheel system 70 includes at least three color wheels, respectively disposed on the transmission path of different light beams, to generate the three primary color lights.

As shown in FIG. 3, the switching system 60 includes a first light switch 601, a second light switch 602, a first controller 603, a first dichroic prism 604, a second dichroic prism 605, and a reflector 606. The first light switch 601 and the second light switch 602 may be electro-optical devices such as a liquid crystal phase retarder, or magneto-optical devices, or acousto-optic devices. The color wheel system 70 includes a first color wheel 701, a second color wheel 702, and a third color wheel 703. The first color wheel 701 is a color wheel containing a red phosphor; the second color wheel 702 is a color wheel containing a green phosphor; and the third color wheel 703 is a color wheel containing a scattering powder. The light combination system includes a reflector 503, a dichroic mirror 505 and a dichroic mirror 506. The dichroic mirrors 505 and 506 are partly transmitting, partly reflecting mirrors. The spatial light modulator system includes a light splitting and combining prism 808, spatial light modulator component 809 and a second controller.

When the image processing system 10 receives the image or video source data, it decodes the source data to obtain individual frames of source image data. It then determines the grayscale value adjustment ratio of at least one primary color image based on maximum grayscale values of the primary color images of the source image, adjusts the grayscale value of the corresponding primary color image based on the grayscale value adjustment ratio, and transmits the grayscale value adjustment ratio to the first controller 603 and the second controller. The first controller 603 adjusts the output powers of the primary color lights generated by the light source system. The second controller, based on the adjusted output powers of the primary color lights and the adjusted grayscale values of the primary color images, adjusts the ON time of the spatial light modulator system.

The process by which the first controller 603 controls the output powers, i.e. the sustained duration, of the three primary color lights generated by the light source system includes: After the first controller 603 receives the grayscale value adjustment ratio, based on the grayscale value adjustment ratio, it controls the durations of the first light beam and the second light beam output by the first light switch 601, as well as the durations of the third light beam and the fourth light beam output by the second light switch 602, so as to control the output powers of the primary color lights generated by the light source system. The first light beam and the second light beam have different polarization states, and the third light beam and the fourth light beam have different polarization states.

The first controller 603 controls the sustained durations of the three primary color lights to $T_R'$, $T_G'$ and $T_B'$, which satisfy the following conditions:

$$T_R + T_G + T_B = T_R' + T_G' + T_B' = T; \quad (1)$$

$$L_R \times A_R \times \frac{T_R}{K} : L_G \times A_G \times \frac{T_G}{K} : L_B \times A_B \times \frac{T_B}{K} = \quad (2)$$

$$L_R \times A_R' \times \frac{T_R'}{K} : L_G \times A_G' \times \frac{T_G'}{K} : L_B' \times A_B' \times \frac{T_B'}{K};$$

where $A_R'=A_R \times M_R$; $A_G'=A_G \times M_G$; $A_B'=A_B \times M_B$; T is the display duration of a frame of image; K is the maximum grayscale value that can be achieved by the spatial light modulator system; $A_R$ is the maximum grayscale value of the red primary color image before adjustment; $A_G$ is the maximum grayscale value of the green primary color image before adjustment; $A_B$ is the maximum grayscale value of the blue primary color image before adjustment; $A_R'$ is the maximum grayscale value of the red primary color image after adjustment; $A_G'$ is the maximum grayscale value of the green primary color image after adjustment; $A_B'$ is the maximum grayscale value of the blue primary color image after adjustment; $M_R$ is the grayscale value adjustment ratio of the red primary color image; $M_G$ is the grayscale value adjustment ratio of the green primary color image; $M_B$ is the grayscale value adjustment ratio of the blue primary color image; $L_R$ is the brightness of the red primary color light; $L_G$ is the brightness of the green primary color light; $L_B$ is the brightness of the blue primary color light; $T_R$ is the sustained duration of the red primary color light before adjustment; $T_G$ is the sustained duration of the green primary color light before adjustment; and $T_B$ is the sustained duration of the blue primary color light before adjustment.

Under the control of the first controller 603, the first light switch 601, within first time intervals, switches the S polarized blue light λ0 emitted by the light source 30 into the first light beam λ1, and within second time intervals, switches the light λ0 emitted by the light source 30 into the second light beam λ2, where the switched first light beam λ1 remains S polarized blue light, and the switched second light beam λ2 becomes P polarized blue light. Similarly, under the control of the first controller 603, the second light switch 602, within first sub-intervals of the second time intervals, switches the second light beam λ2 into the third light beam λ3, i.e., it rotates the polarization of the P polarized blue light λ2 by 90 degrees to an S polarized blue light beam λ3, and within the second sub-intervals of the second time intervals, switches the second light beam λ2 into the fourth light beam λ4, which remains a P polarized blue light.

The first dichroic prism 604 transmits the second light beam λ2, i.e. the P polarized blue light, and reflects the first light beam λ1, i.e., the S polarized blue light, to the first color wheel 701 located on the first light path. The first color wheel 701 has a red phosphor, and can absorb the blue light to generate a red light R, i.e., it generates the first primary color light i.e. red light. The second dichroic prism 605 transmits the fourth light beam λ4, i.e. the P polarized blue light, and reflects the third light beam λ3, i.e., the S polarized blue light, to the second color wheel 702 located on the second light path. The second color wheel 702 has a green phosphor, and can absorb the blue light to generate a green light R, i.e., it generates the second primary color light i.e. green light G. The reflector 606 reflects the fourth light beam λ4 which has transmitted through the second dichroic prism 605, i.e., the P polarized blue light, to the third color wheel 703 located on the third light path. The third color wheel 703 has a scattering powder, and can transmit blue light and depolarize the S polarized blue light, and outputs it as the third primary color light i.e. blue light B. The durations of the first primary color light, the second primary color light and the third primary color light are $T_R'$, $T_G'$ and $T_B'$, where the sum of $T_R'$, $T_G'$ and $T_B'$ is the time duration of a frame of image, T.

Then, the first primary color light is reflected by the reflector 503 to be incident on the dichroic filter 505; after passing through the dichroic filter 505, the dichroic filter 506 and the light splitting and combining prism 808, it enters the spatial light modulator component 809 to be modulated. The second primary color light is reflected by the dichroic filter 505; after passing through the dichroic filter 506 and the light splitting and combining prism 808, it enters the spatial light modulator component 809 to be modulated. The third primary color light is reflected by the dichroic filter 506; after passing through the light splitting and combining prism 808, it enters the spatial light modulator component 809 to be modulated.

In this embodiment, to increase the utilization efficiency of the spatial light modulator system, the durations of the R, G, B primary color lights generated by the light source system are respectively adjusted to $T_R'$, $T_G'$ and $T_B'$, where $T_R'+T_G'+T_B'=T$. The adjusted output powers of the R, G, B primary color lights of the projected image are respectively $L_R \cdot T_R$, $L_G \cdot T_G$, and $L_B \cdot T_B$. After the adjustment, the ratio of the RGB primary color lights is the same as the ratio of the primary color lights of the projection system before the adjustment, so as to maintain the white balance, i.e.: $L_R \cdot A_R' T_R'/K : L_G \cdot A_G' T_G'/K : L_B \cdot A_B' T_B'/K = L_R \cdot A_R T_R/K : L_G \cdot A_G T_G/K : L_B \cdot A_B T_B/K$. Thus, it can be seen that the grayscale brightness values of the RGB primary color lights after the adjustment, relative to the values before the adjustment, are increased by a ratio of $A_R' T_R'/A_R T_R = A_G' T_G'/A_G T_G = A_B' T_B'/A_B T_B$.

Further, to maximally increase the brightness of the projected image, the maximum grayscale values of all three primary color images can be increased to K (e.g. 255), i.e., $A_R'=K$, $A_G'=K$, $A_B'=K$. In this case, the brightness of the projected image after the adjustment is increased relative to before the adjustment by a ratio of $KT_R'/A_R T_R$.

In the projection system of this embodiment, based on the maximum grayscale values of the primary color images of the source image, the grayscale value adjustment ratio of at least one primary color image is determined; based on the grayscale value adjustment ratio, the grayscale values of the corresponding primary color images are adjusted; based on the grayscale value adjustment ratio of at least one primary color image, the sustained durations of the primary color lights generated by the light source system are adjusted; based on the adjusted durations of the primary color lights and the adjusted grayscale values of the primary color images, the ON time of the spatial light modulator system is controlled. This way, in the projected image formed by the spatial light modulator system, the grayscale brightness values of the primary color images are increased by the same ratio relative to the grayscale brightness values of the corresponding primary color images of the source image. I.e., by increasing the grayscale value of at least one primary color image, the utilization efficiency of the spatial light modulator system and the efficiency of the projection system are increased.

Third Embodiment

Figure 4:
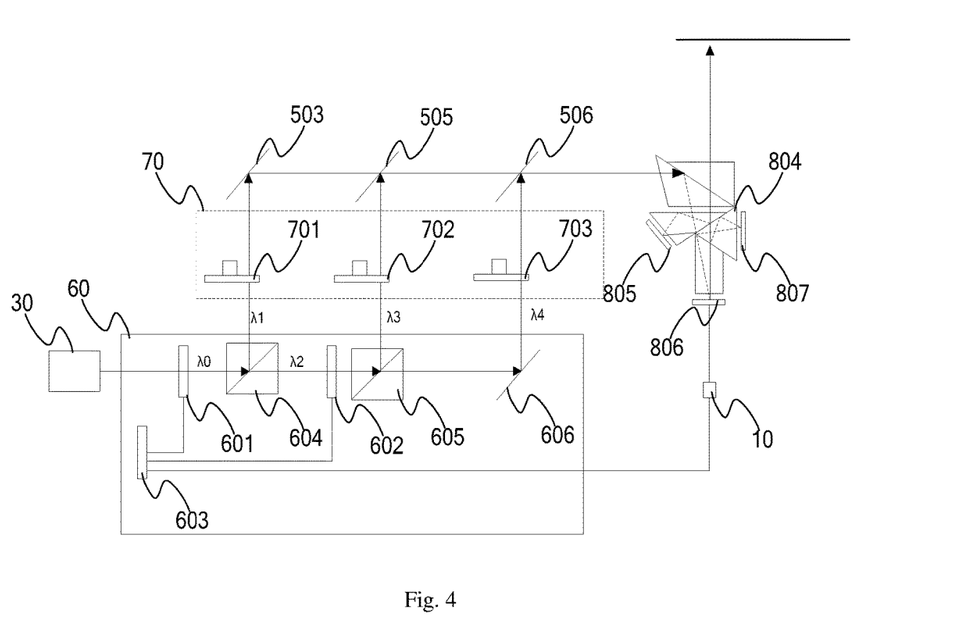
FIG. 4 schematically illustrates a structure of a projection system according to a third embodiment of the present invention.

This embodiment provides a projection system, which has a structure similar to that of the projection system of the second embodiment; one difference is that in the third embodiment, the switching system uses light intensity division to switch the light generated by the light source into at least three light beams. Further, the spatial light modulator system of this embodiment, as shown in FIG. 4, includes a light splitting and combining prism 804, a first spatial light modulator component 805, a second spatial light modulator component 806, and a third spatial light modulator component 807.

In this embodiment, when the image processing system 10 receives the image or video source data, it decodes the source data to obtain individual frames of source image data. It then determines the grayscale value adjustment ratio of at least one primary color image based on the maximum grayscale values of the primary color images of the source image, adjusts the grayscale value of the corresponding primary color image based on the grayscale value adjustment ratio, and transmits the grayscale value adjustment ratio to the first controller 603 and the second controller. The first controller 603 adjusts the output powers of the primary color lights generated by the light source system. The second controller, based on the adjusted output powers of the primary color lights and the adjusted grayscale values of the primary color images, adjusts the ON time of the spatial light modulator system.

The process by which the first controller 603 controls the output power (i.e. brightness) of the three primary color lights generated by the light source system includes: After the first controller 603 receives the grayscale value adjustment ratio, based on the grayscale value adjustment ratio of the primary colors, it controls the rotation angles of the first light switch and the second light switch, so as to control the output power (i.e. brightness) of the primary color lights generated by the light source system.

More specifically, the step of controlling the brightness of the primary color lights based on the grayscale value adjustment ratio of the primary color image includes the following:

Adjusting the brightness values of the three primary color lights to $L_R'$, $L_G'$ and $L_B'$, which satisfy the following conditions:

$$L_R + L_G + L_B = L_R' + L_G' + L_B' = L; \quad (1)$$

$$L_R \times A_R \times \frac{T}{K} : L_G \times A_G \times \frac{T}{K} : L_B \times A_B \times \frac{T}{K} = \quad (2)$$
$$L_R' \times A_R' \times \frac{T}{K} : L_G' \times A_G' \times \frac{T}{K} : L_B' \times A_B' \times \frac{T}{K};$$

where $A_R'=A_R \times M_R$; $A_G'=A_G \times M_G$; $A_B'=A_B \times M_B$; T is the display duration of a frame of image; L is the total brightness of the three primary color lights; K is the maximum grayscale value that can be achieved by the spatial light modulator system; $A_R$ is the maximum grayscale value of the red primary color image before adjustment; $A_G$ is the maximum grayscale value of the green primary color image before adjustment; $A_B$ is the maximum grayscale value of the blue primary color image before adjustment; $A_R'$ is the maximum grayscale value of the red primary color image after adjustment; $A_G'$ is the maximum grayscale value of the green primary color image after adjustment; $A_B'$ is the maximum grayscale value of the blue primary color image after adjustment; $M_R$ is the grayscale value adjustment ratio of the red primary color image; $M_G$ is the grayscale value adjustment ratio of the green primary color image; $M_B$ is the grayscale value adjustment ratio of the blue primary color image; $L_R$ is the brightness of the red primary color light; $L_G$ is the brightness of the green primary color light; and $L_B$ is the brightness of the blue primary color light.

Assuming that the light intensity of the light generated by the light source is I, the rotation angle of the first light switch 601 is $\alpha$, which is between 0 degrees and 90 degrees, then the output light of the first light switch 601 contains both S polarized light and P polarized light, and the light intensities of the S polarized light and the P polarized light are respectively $I \cos^2 \alpha$ and $I \sin^2 \alpha$; i.e., the light intensities of the first light beam λ1 and the second light beam λ2 are respectively $I \cos^2 \alpha$ and $I \sin^2 \alpha$. Assuming the rotation angle of the second light switch 602 is β, then the light intensities of the S polarized light and the P polarized light output by the second light switch 602 are respectively $I \sin^2 \alpha \sin^2 \beta$ and $I \sin^2 \alpha \cos^2 \beta$; i.e., the light intensities of the third light beam λ3 and the fourth light beam λ4 are respectively $I \sin^2 \alpha \sin^2 \beta$ and $I \sin^2 \alpha \cos^2 \beta$.

Under the control of the first controller 603, the first light switch 601 switches the light beam λ0 emitted by the light source 30 into a first light beam λ1 which is an S polarized blue light and a second light beam λ2 which is a P polarized blue light. Similarly, under the control of the first controller 603, the second light switch 602 switches the second light beam λ2 into a third light beam λ3 which is an S polarized blue light and a fourth light beam λ4 which is a P polarized blue light.

The first dichroic prism 604 transmits the second light beam λ2, i.e. the P polarized blue light, and reflects the first light beam λ1, i.e., the S polarized blue light, to the first color wheel 701 located on the first light path. The first color wheel 701 has a red phosphor, and can absorb the blue light to generate a red light R, i.e., it generates the first primary color light i.e. red light. The second dichroic prism 605 transmits the second light beam λ4, i.e. the P polarized blue light, and reflects the third light beam λ3, i.e., the S polarized blue light, to the second color wheel 702 located on the second light path. The second color wheel 702 has a green phosphor, and can absorb the blue light to generate a green light, i.e., it generates the second primary color light i.e. green light. The reflector 606 reflects the fourth light beam λ4 which has transmitted through the second dichroic prism 605, i.e., the P polarized blue light, to the third color wheel 703 located on the third light path. The third color wheel 703 has a scattering powder, and can transmit blue light and depolarize the S polarized blue light, and outputs it as the third primary color light i.e. blue light. The light intensities of the first primary color light, the second primary color light and the third primary color light are respectively $I \cos^2 \alpha$, $I \sin^2 \alpha \sin^2 \beta$ and $I \sin^2 \alpha \cos^2 \beta$.

Then, the first primary color light is reflected by the reflector 503 to be incident on the dichroic filter 505; after passing through the dichroic filter 505, the dichroic filter 506 and the light splitting and combining prism 804, it enters the first spatial light modulator component 805 to be modulated. The second primary color light is reflected by the dichroic filter 505; after passing through the dichroic filter 506 and the light splitting and combining prism 804, it enters the second spatial light modulator component 806 to be modulated. The third primary color light is reflected by the dichroic filter 506; after passing through the light splitting and combining prism 804, it enters the third spatial light modulator component 807 to be modulated. The second controller, after receiving a second control command, controls the first spatial light modulator component 805, the second spatial light modulator component 806 and the third spatial light modulator component 807 to modulate the first primary color light, the second primary color light and the third primary color light during the time interval T which is the time of one frame of image.

In this embodiment, to increase the utilization efficiency of the spatial light modulator system, the image processing system 10 adjusts the intensities of the RGB primary color lights generated by the light source to $L_R'$, $L_G'$ and $L_B'$, respectively, where $L_R'=I\cos^2\alpha$, $L_G'=I\sin^2\alpha\sin^2\beta$, and $L_B'=I\sin^2\alpha\cos^2\beta$. The time durations in which the first spatial light modulator component 805, the second spatial light modulator component 806 and the third spatial light modulator component 807 modulate the respective lights are all the time interval T which is the time of one frame of image. Thus, in this embodiment, the brightness values of the projected image are respectively $L_R'\cdot T$, $L_G'\cdot T$, and $L_B'\cdot T$. After the adjustment, the ratio of the RGB primary color lights is the same as the ratio of the primary color lights of the projection system before the adjustment, i.e.: $L_R'\cdot A_R'$ $T/K:L_G'\cdot A_G'T/K:L_B'\cdot A_B'T/K=L_R\cdot A_RT/K:L_G\cdot A_GT/K:L_B\cdot A_BT/K$. Thus, it can be seen that the grayscale brightness values of the RGB primary color lights after the adjustment, relative to the values before the adjustment, are increased by a ratio of $A_R'L_R'/A_RL_R$, where $A_R'L_R'/A_RL_R=A_G'L_G/A_GL_G=A_B'L_B'/A_BL_B$.

Further, to maximally increase the brightness of the projected image, the maximum grayscale values of all three primary color images can be increased to K (e.g. 255), i.e., $A_R'=K$, $A_G'=K$, $A_B'=K$. In this case, the brightness of the projected image after the adjustment is increased relative to before the adjustment by a ratio of $KT_R'/L_RT_R$. In the projection system of this embodiment, based on the maximum grayscale values of the primary color images of the source image, the grayscale value adjustment ratio of at least one primary color image is determined; based on the grayscale value adjustment ratio, the grayscale values of the corresponding primary color images are adjusted; based on the grayscale value adjustment ratio of at least one primary color image, the brightness values of the primary color lights generated by the light source system are adjusted; and based on the adjusted brightness values of the primary color lights and the adjusted grayscale values of the primary color images, the ON time of the spatial light modulator system is adjusted. This way, in the projected image formed by the spatial light modulator system, the grayscale brightness values of the primary color images are increased by the same ratio relative to the grayscale brightness values of the corresponding primary color images of the source image. I.e., by increasing the grayscale value of at least one primary color image, the utilization efficiency of the spatial light modulator system and the efficiency of the projection system are increased.

The embodiments are described in a progressive manner in this disclosure, and each embodiment is described by focusing on its differences from other embodiment; the similar aspects of the embodiments can be understood by referring to each other. It will be apparent to those skilled in the art that various modification and variations can be made in the projection system and control method of the present invention without departing from the spirit or scope of the invention. Thus, it is intended that the present invention cover modifications and variations that come within the scope of the appended claims and their equivalents.

What is claimed is:

1. A control method for controlling a projection system, the projection system including a light source system for generating three primary color lights and a spatial light modulator system for modulating the three primary color lights, the method comprising:

based on maximum grayscale values of three primary color images of a frame of source image, determining a grayscale value adjustment ratio of at least one of the three primary color images;

based on the grayscale value adjustment ratio of the at least one primary color image, adjusting grayscale values of the primary color images;

based on the adjusted grayscale values of the primary color images and light output powers of the primary color lights generated by the light source system that correspond to the primary color images, controlling an ON time of the spatial light modulator system, wherein in the projected image formed by the spatial light modulator system, grayscale brightness values of all of the primary color images are increased by a same ratio relative to grayscale brightness values of the corresponding primary color images of the source image.

2. The control method of claim 1, wherein the step of based on the maximum grayscale value of the primary color images of the frame of source image, determining the grayscale value adjustment ratio of the at least one primary color image includes:

obtaining a maximum grayscale value Ai of a primary color image of the source image; and setting the grayscale value adjustment ratio for that primary color to Mi;

wherein $1\leq Mi\leq(K/Ai)$, wherein i is an index of the primary color image, and K is a maximum grayscale value that the spatial light modulator system is capable of displaying.

3. The control method of claim 2, wherein the step of based on the grayscale value adjustment ratio of the at least one primary color image, adjusting the grayscale values of the primary color images includes:

adjusting the grayscale value of the primary color image to Ai', wherein Ai'=Ai*Mi, wherein Ai is the grayscale value of the primary color before the adjustment, and Ai' is a grayscale value of the primary color after the adjustment.

4. The control method of claim 1, wherein in the step of based on the adjusted grayscale values of the primary color images and the light output powers of the primary color lights that correspond to the primary color images, controlling the ON time of the spatial light modulator system, wherein in the projected image formed by the spatial light modulator system, the grayscale brightness values of the primary color images are increased by the same ratio relative to the grayscale brightness values of the corresponding primary color images of the source image, the adjusted grayscale values of the primary color images satisfy:

$A_R:A_G:A_B=A_R':A_G':A_B'$, wherein $A_R'=A_R\times M_R$, $A_G'=A_G\times M_G$, and $A_B'=A_B\times M_B$;

wherein $A_R$ is a maximum grayscale value of a red primary color image before adjustment, $A_G$ is a maximum grayscale value of a green primary color image before adjustment, $A_B$ is a maximum grayscale value of a blue primary color image before adjustment;

wherein $A_R'$ is a maximum grayscale value of the red primary color image after adjustment, $A_G'$ is a maximum grayscale value of the green primary color image after adjustment, $A_B'$ is a maximum grayscale value of the blue primary color image after adjustment; and wherein $M_R$ is a grayscale value adjustment ratio of the red primary color image, $M_G$ is a grayscale value adjustment ratio of the green primary color image, and $M_B$ is a grayscale value adjustment ratio of the blue primary color image.

5. The control method of claim 1, wherein the three primary color lights generated by the light source system are independently adjustable.

6. The control method of claim 5, further comprising, before the step of based on the adjusted grayscale values of the primary color images and the light output powers of the primary color lights, controlling the ON time of the spatial light modulator system:

based on the grayscale value adjustment ratio of the at least one primary color image, adjusting the light output powers of the primary color lights that correspond to the primary color images of the source image, wherein in the projected image formed by the spatial light modulator system, the grayscale brightness values of the primary color images are increased by the same ratio relative to the grayscale brightness values of the corresponding primary color images of the source image;

wherein the step of based on the adjusted grayscale values of the primary color images and light output powers of the primary color lights, controlling the ON time of the spatial light modulator system includes:

based on the adjusted light output powers of the primary color lights that correspond to the primary color images and the adjusted grayscale values of the corresponding primary color images, adjusting the ON time of the spatial light modulator system.

7. The control method of claim 6, wherein the step of based on the grayscale value adjustment ratio of the at least one primary color image, adjusting the light output powers of the primary color lights that correspond to the primary color images of the source image includes:

based on the grayscale value adjustment ratio of the at least one primary color image, adjusting sustained durations or brightness values of the primary color lights that correspond to the primary color images of the source image.

8. The control method of claim 7, wherein the step of based on the grayscale value adjustment ratio of the at least one primary color image, adjusting the sustained duration of the primary color lights that correspond to the primary color images of the source image includes:

adjusting the sustained durations of the primary color lights to $T_R'$, $T_G'$ and $T_B'$, which satisfy:

$$T_R + T_G + T_B = T_R' + T_G' + T_B' = T; \tag{1}$$

$$L_R \times A_R \times \frac{T_R}{K} : L_G \times A_G \times \frac{T_G}{K} : L_B \times A_B \times \frac{T_B}{K} = \tag{2}$$
$$L_R \times A_R' \times \frac{T_R'}{K} : L_G \times A_G' \times \frac{T_G'}{K} : L_B \times A_B' \times \frac{T_B'}{K};$$

wherein $A_R'=A_R\times M_R$; $A_G'=A_G\times M_G$; $A_B'=A_B\times M_B$; T is a display duration of a frame of image, K is a maximum grayscale value that the spatial light modulator system is capable of displaying;

wherein $A_R$ is a maximum grayscale value of a red primary color image before adjustment, $A_G$ is a maximum grayscale value of a green primary color image before adjustment, $A_B$ is a maximum grayscale value of a blue primary color image before adjustment;

wherein $A_R'$ is a maximum grayscale value of the red primary color image after adjustment, $A_G'$ is a maximum grayscale value of the green primary color image after adjustment, $A_B'$ is a maximum grayscale value of the blue primary color image after adjustment;

wherein $M_R$ is a grayscale value adjustment ratio of the red primary color image, $M_G$ is a grayscale value adjustment ratio of the green primary color image, $M_B$ is a grayscale value adjustment ratio of the blue primary color image;

wherein $L_R$ is a brightness value of the red primary color light, $L_G$ is a brightness value of the green primary color light, $L_B$ is a brightness value of the blue primary color light; and wherein $T_R$ is a sustained duration of the red primary color light before adjustment, $T_G$ is a sustained duration of the green primary color light before adjustment, and $T_B$ is a sustained duration of the blue primary color light before adjustment.

9. The control method of claim 7, wherein the step of based on the grayscale value adjustment ratio of the at least one primary color image, adjusting the brightness values of the primary color lights that correspond to the primary color images of the source image includes:

adjusting the brightness values of the primary color lights to $L_R'$, $L_G'$ and $L_B'$, which satisfy:

$$L_R + L_G + L_B = L_R' + L_G' + L_B' = L; \tag{1}$$

$$L_R \times A_R \times \frac{T}{K} : L_G \times A_G \times \frac{T}{K} : L_B \times A_B \times \frac{T}{K} = \tag{2}$$
$$L_R' \times A_R' \times \frac{T}{K} : L_G' \times A_G' \times \frac{T}{K} : L_B' \times A_B' \times \frac{T}{K};$$

wherein $A_R'=A_R\times M_R$; $A_G'=A_G\times M_G$; $A_B'=A_B\times M_B$; T is a display duration of a frame of image, L is a total brightness value of the three primary color lights, K is a maximum grayscale value that the spatial light modulator system is capable of displaying;

wherein $A_R$ is a maximum grayscale value of a red primary color image before adjustment, $A_G$ is a maximum grayscale value of a green primary color image before adjustment, $A_B$ is a maximum grayscale value of a blue primary color image before adjustment;

wherein $A_R'$ is a maximum grayscale value of the red primary color image after adjustment, $A_G'$ is a maximum grayscale value of the green primary color image after adjustment, $A_B'$ is a maximum grayscale value of the blue primary color image after adjustment;

wherein $M_R$ is a grayscale value adjustment ratio of the red primary color image, $M_G$ is a grayscale value adjustment ratio of the green primary color image, $M_B$ is a grayscale value adjustment ratio of the blue primary color image; and wherein $L_R$ is a brightness of the red primary color light, $L_G$ is a brightness of the green primary color light, and $L_B$ is a brightness of the blue primary color light.

10. A projection system, comprising a light source system, a spatial light modulator system, and an image processing system;

wherein the light source system generates three primary color lights;

wherein the spatial light modulator system includes at least one spatial light modulator component for modulating the three primary color lights, wherein the image processing system is configured to: based on maximum grayscale values of the primary color images of a frame of source image, determine a grayscale value adjustment ratio of at least one of the primary color images; based on the grayscale value adjustment ratio, adjust grayscale values of the primary color images; based on the grayscale value adjustment ratio of the at least one primary color image, adjust light output powers of the primary color lights generated by the light source system that correspond to the primary color images of the source image; and based on the adjusted light output powers of the primary color lights and the adjusted grayscale values of the primary color images, adjust an ON time of the spatial light modulator system; wherein in a projected image formed by the spatial light modulator system, grayscale brightness values of the primary color images are increased by a same ratio relative to grayscale brightness values of the corresponding primary color images of the source image.

11. The projection system of claim 10, wherein the light source system includes a light source, a switching system, and a color wheel system;

wherein the switching system switches a light emitted by the light source into at least three light beams using time division or light intensity division; and wherein the color wheel system is disposed on the transmission path of each of the at least three light beams, for generating three primary color lights of predetermined ratios when illuminated by the at least three light beams.

12. The projection system of claim 11, wherein the switching system switches the light emitted by the light source into at least three light beams using the time division, the switching system includes a first light switch, a second light switch and a first controller;

wherein the first light switch switches the light emitted by the light source into a first light beam within first time intervals, and switches the light emitted by the light source into a second light beam within second time intervals, where the first light beam and the second light beam have different polarization states;

wherein the second light switch switches the second light beam into a third light beam within first sub-intervals of the second time intervals, and switches the second light beam into a fourth light beam within a second sub-intervals of the second time intervals, where the third light beam and the fourth light beam have different polarization states;

wherein the first controller, based on the grayscale value adjustment ratio of the at least one primary color image, controls durations of the first light beam and the second light beam output by the first light switch and durations of the third light beam and the fourth light beam output by the second light switch, to control the light output powers of the primary color lights generated by the light source system that correspond to the primary color images of the source image.

13. The projection system of claim 11, wherein the switching system switches the light emitted by the light source into at least three light beams using the light intensity division, the switching system includes a first light switch, a second light switch and a first controller;

wherein the first light switch switches the light emitted by the light source into a first light beam and a second light beam simultaneously, where the first light beam and the second light beam have different polarization states;

wherein the second light switch switches the second light beam into a third light beam and a fourth light beam simultaneously, where the third light beam and the fourth light beam have different polarization states;

wherein the first controller, based on the grayscale value adjustment ratio of the at least one primary color image, controls rotation angles of the first light switch and the second light switch, to control the light output powers of the primary color lights generated by the light source system that correspond to the primary color images of the source image.

14. The projection system of claim 12, wherein the color wheel system includes a first color wheel, a second color wheel, and a third color wheel;

wherein the first color wheel is located on a first light path of the first light beam, for generating the first primary color light when illuminated by the first light beam; wherein the second color wheel is located on a second light path of the third light beam, for generating the second primary color light when illuminated by the third light beam; and wherein the third color wheel is located on a third light path of the fourth light beam, for generating the third primary color light when illuminated by the fourth light beam.

15. The projection system of claim 14, wherein the first color wheel is a color wheel containing a red phosphor, wherein the first primary color light is a red light; wherein the second color wheel is a color wheel containing a green phosphor, wherein the second primary color light is a green light; and wherein the third color wheel is a color wheel containing a scattering powder, wherein the third primary color light is a blue light.

16. The projection system of claim 15, wherein the switching system further includes a first dichroic prism, a second dichroic prism, and a reflector;

wherein the first dichroic prism is located between the first light switch and the first color wheel, for reflecting the first light beam to the first light path and transmitting the second light beam;

wherein the second dichroic prism is located between the second light switch and the second color wheel, for reflecting the third light beam to the second light path and transmitting the fourth light beam; and wherein the reflector is located between the second dichroic prism and the third color wheel, for reflecting the fourth light beam to the third light path.

17. The projection system of claim 16, further comprising a light combination system located between the light source system and the spatial light modulator system;

wherein the light combination system includes at least one reflector and at least two dichroic mirrors, wherein the reflector and the dichroic mirrors are respectively located on output paths of different primary color lights, for reflecting the primary color lights to the spatial light modulator system.

18. The projection system of claim 17, wherein the switching system switches the light emitted by the light source into the at least three light beams using the time division, the spatial light modulator system includes a light splitting and combining prism, a spatial light modulator component and a second controller;

wherein the light splitting and combining prism sequentially transmits the first primary color light, the second primary color light and the third primary color light to the spatial light modulator component; and wherein the spatial light modulator component sequentially modulates the first primary color light, the second primary color light and the third primary color light, wherein the modulated first primary color light, second primary color light and third primary color light combine to form an image; and wherein the second controller, based on the adjusted grayscale values of the primary color images and the light output powers of the primary color lights that correspond to the primary color images, controls the ON time of the spatial light modulator component.

19. The projection system of claim 17, wherein the switching system switches the light emitted by the light source into at least three light beams using light intensity division, the switching system includes a light splitting and combining prism, a first spatial light modulator component, a second spatial light modulator component, a third spatial light modulator component and a second controller;

wherein the light splitting and combining prism transmits the first primary color light to the first spatial light modulator component, transmits the second primary color light to the second spatial light modulator component, transmits the third primary color light to the third spatial light modulator component;

wherein the first spatial light modulator component modulates the first primary color light;

wherein the second spatial light modulator component modulates the second primary color light;

wherein the third spatial light modulator component modulates the third primary color light; and wherein the second controller, based on the adjusted grayscale values of the primary color images and the light output powers of the primary color lights that correspond to the primary color images, controlling an ON time of each of the first spatial light modulator component, the second spatial light modulator component and the third spatial light modulator component.

* * * * *